US008917418B2

(12) United States Patent
Yamanobe

(10) Patent No.: US 8,917,418 B2
(45) Date of Patent: Dec. 23, 2014

(54) IMAGE RECORDING APPARATUS FOR DETECTING DEFECTS IN NOZZLES USING TEST PATTERNS DURING ACCELERATION AND DECELERATION OF RECORDING MEDIUM

(75) Inventor: Jun Yamanobe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 107 days.

(21) Appl. No.: 13/190,492

(22) Filed: Jul. 26, 2011

(65) Prior Publication Data

US 2012/0050821 A1 Mar. 1, 2012

(30) Foreign Application Priority Data

Aug. 27, 2010 (JP) ................................ 2010-191274

(51) Int. Cl.

| | |
|---|---|
| ***H04N 1/00*** | (2006.01) |
| ***H04N 1/46*** | (2006.01) |
| ***G06K 1/00*** | (2006.01) |
| ***B41J 2/12*** | (2006.01) |
| ***B41J 2/195*** | (2006.01) |
| ***B41J 29/38*** | (2006.01) |
| ***B41J 29/393*** | (2006.01) |
| ***B41J 2/21*** | (2006.01) |
| ***B41J 2/165*** | (2006.01) |
| ***B41J 25/308*** | (2006.01) |

(52) U.S. Cl.

CPC ........... *B41J 2/2146* (2013.01); *B41J 2/16579* (2013.01); *B41J 25/308* (2013.01)

USPC ............. 358/1.5; 358/1.9; 358/502; 358/448; 347/7; 347/12; 347/14; 347/19; 347/78

(58) Field of Classification Search

CPC ................ B41J 11/003; B41J 11/007–11/009; B41J 2/512; B41J 2/2139; B41J 2/2142; B41J 2/2146; G06K 15/102

USPC .......................................................... 358/484

See application file for complete search history.

(56) References Cited

U.S. PATENT DOCUMENTS

| | | | | |
|---|---|---|---|---|
| 6,089,766 | A * | 7/2000 | Yamada et al. | 400/120.09 |
| 2002/0018092 | A1 | 2/2002 | Inui et al. | |
| 2007/0291060 | A1* | 12/2007 | Aruga | 347/12 |

FOREIGN PATENT DOCUMENTS

| | | | |
|---|---|---|---|
| JP | 2001-315351 | | 11/2001 |
| JP | 2008-000903 | A | 1/2008 |
| JP | 2010-58463 | | 3/2010 |

OTHER PUBLICATIONS

Partial English language translation of the following: Office action dated Oct. 15, 2013 from the Japanese Patent Office in a Japanese patent application corresponding to the instant patent application. This office action translation is submitted now in order to supplement the understanding of patent document JP 2001-315351 and JP 2010-58463.

Office action dated Sep. 2, 2014 from the SIPO in a Chinese patent application corresponding to the instant patent application.

* cited by examiner

*Primary Examiner* — Eric A Rust
*Assistant Examiner* — Haris Sabah
(74) *Attorney, Agent, or Firm* — SOLARIS Intellectual Property Group, PLLC

(57) ABSTRACT

An image recording apparatus includes: a conveying section that accelerates a long-length recording medium to a predetermined speed, conveys the long-length recording medium, and decelerates the long-length recording medium to a stopped state; a recording section that records an image on the recording medium, and forms a first test pattern on the recording medium after the image is recorded at a time of deceleration of the recording medium; a reading section that reads the image that the recording section has recorded and the first test pattern that the recording section has formed; an image converting section that converts inputted image data into image data that the recording section outputs; a maintenance section that performs maintenance of the recording section; and a controller that decides, on the basis of first data obtained by reading the first test pattern, whether or not the maintenance is needed and the content thereof.

9 Claims, 3 Drawing Sheets

IMAGE RECORDING APPARATUS FOR DETECTING DEFECTS IN NOZZLES USING TEST PATTERNS DURING ACCELERATION AND DECELERATION OF RECORDING MEDIUM

CROSS-REFERENCE TO RELATED APPLICATION

This application claims priority under 35 USC 119 from Japanese Patent Application No. 2010-191274 filed on Aug. 27, 2010, the disclosure of which is incorporated by reference herein.

BACKGROUND

1. Technical Field

The present invention relates to an image recording apparatus.

2. Related Art

Conventionally, in image recording apparatus that record character information, images, and so forth on a recording medium by methods such as conveying a recording medium such as a web (continuous paper) in a conveyance direction and jetting ink droplets or the like from a head that opposes a recording surface or making impacts by the dot, acceleration and deceleration of the recording medium become necessary a lot.

During acceleration and deceleration of the recording medium, ordinarily recording of images is not performed, but the continuous paper is conveyed also during acceleration and deceleration, so if the number of times of acceleration and deceleration increases, portions where recording is not performed arise in the continuous paper and end up becoming waste paper.

In consideration of this point, an image recording apparatus that corrects with high precision image formation position deviations between different color bars and deviations between short-length modules configuring a single-color bar type inkjet recording head in acceleration, deceleration, and steady speed of continuous paper has been disclosed (e.g., see Japanese Patent Application Laid-Open (JP-A) No. 2008-000903).

However, in JP-A No. 2008-000903, the target to be corrected is mechanical position deviations between bars and between modules configuring a single-color bar, and ordinarily these do not fluctuate that much once the bars are disposed.

On the other hand, jetting disturbances (position deviation and misfiring) of nozzles change greatly due to deterioration of the head over time and environmental fluctuations. When image formation that ignores these is performed, image deterioration such as stripe unevenness ends up arising, and there is the fear that the quality level will drop.

However, when information collection needed for maintenance for correcting the jetting disturbances in image recording using continuous paper—that is, test printing for identifying misfiring nozzles and identifying the cause of jetting direction deviations—is performed separately from the current printing, there is the problem that the number of times of acceleration and deceleration increases as described above and waste paper ends up increasing in accompaniment therewith.

SUMMARY

In consideration of the above-described circumstances, the present invention provides an image recording apparatus that has excellent maintenance efficiency and in which waste paper is kept little.

An image recording apparatus of a first aspect of the invention includes: a conveying section that accelerates a long-length recording medium from a stopped state to a predetermined speed, that conveys the long-length recording medium, and that decelerates the long-length recording medium to the stopped state; a recording section that records an image on the recording medium, and that forms a first test pattern on the recording medium after the image is recorded at a time of deceleration of the recording medium; a reading section that reads the image that the recording section has recorded and the first test pattern that the recording section has formed; an image converting section that converts inputted image data into image data that the recording section outputs; a maintenance section that performs maintenance of the recording section; and a controller that decides, on the basis of first data obtained by reading the first test pattern, whether or not the maintenance is needed and the content thereof.

According to the image recording apparatus of the first aspect of the invention, there can be provided an image recording apparatus that has excellent maintenance efficiency and in which waste paper is kept little.

An image recording apparatus of a second aspect of the invention forms a second test pattern on the recording medium at the time of acceleration of the recording medium, and decides, on the basis of the first data and second data obtained by reading the second test pattern, whether or not the maintenance is needed and the content thereof.

According to the image recording apparatus of the second aspect of the invention, nozzles that are constantly jetting-defective and nozzles that have become defective in the current printing can be separated, and maintenance conditions whose precision is higher can be set.

An image recording apparatus of a third aspect of the invention forms the second test pattern with a plurality of colors, and an output color order of the second test pattern is in descending order of proportions of intermediate densities of the image data.

According to the image recording apparatus of the third aspect of the invention, the image recording apparatus measures at a stage where the conveyance speed is low in order beginning with the color in which the proportion of the intermediate density is large, so time for correcting the data of a color in which dot position deviation and dot diameter precision are easily noticeable can be ensured.

An image recording apparatus of a fourth aspect of the invention forms a second test pattern with a plurality of colors, and an output color order of the second test pattern is in ascending order of S/N values of the image data read in the reading section.

According to the image recording apparatus of the fourth aspect of the invention, the image recording apparatus measures at a stage where the conveyance speed is low in order beginning with the color whose read S/N value is low, so time can be applied for reading color data whose read S/N value is low, and reading precision can be improved.

In an image recording apparatus of a fifth aspect of the invention, the recording section is equipped with an inkjet recording head, and at least one of the first test pattern and the second test pattern is a pattern for detecting jetting defects per nozzle of the inkjet recording head.

According to the image recording apparatus of the fifth aspect of the invention, misfiring nozzles can be detected by a unit of the nozzle.

An image recording apparatus of a sixth aspect of the invention does not perform the maintenance in a case where a number of misfiring nozzles detected in the pattern for detecting jetting defects is equal to or less than a predetermined number.

According to the image recording apparatus of the sixth aspect of the invention, the image recording apparatus does not go ahead and perform the maintenance if there are few misfiring nozzles, so process time and costs can be reduced.

In an image recording apparatus of a seventh aspect of the invention, at least one of the first test pattern and the second test pattern is a pattern for detecting average density of a predetermined region.

According to the image recording apparatus of the seventh aspect of the invention, misfiring of plural nozzles can be made detectable.

An image recording apparatus of an eighth aspect of the invention forms a first test pattern with a plurality of colors, and an output color order of the first test pattern is in descending order of S/N values of the image data read in the reading section.

According to the image recording apparatus of the eighth aspect of the invention, the image recording apparatus measures at a stage where the conveyance speed is high in order beginning with the color whose read S/N value is high, so time can be applied for reading color data whose read S/N value is low, and reading precision can be improved.

An image recording apparatus of a ninth aspect of the invention further includes a distance controlling section that controls a distance between the recording section and the recording medium, wherein the image recording apparatus forms the first test pattern a plural number of times while changing the distance during one deceleration and decides, from a relationship between the distance and recording position deviation information extracted from plural sets of the first data read by the reading section, whether or not the maintenance is needed and the content thereof.

According to the image recording apparatus of the ninth aspect of the invention, position deviation causes can be separated into jetting direction deviations and nozzle position deviations from changes in landing position deviation amounts resulting from the distance (TD) between the recording section and the recording medium and can be handled individually.

In an image recording apparatus of a tenth aspect of the invention, the recording section is equipped with an inkjet recording head, and the content of the maintenance includes wiping a nozzle surface of the inkjet recording head and forced jetting.

According to the image recording apparatus of the tenth aspect of the invention, the image recording apparatus performs forced jetting (purging) of ink as needed in addition to maintenance resulting from common wiping of the nozzle surface, so maintenance that is even more effective can be performed.

BRIEF DESCRIPTION OF THE DRAWINGS

Exemplary embodiments of the present invention will be described in detail based on the following figures, wherein.

DETAILED DESCRIPTION

An exemplary embodiment pertaining to the present invention will be described below with reference to the drawings.

<Overall Configuration>

Figure 1:
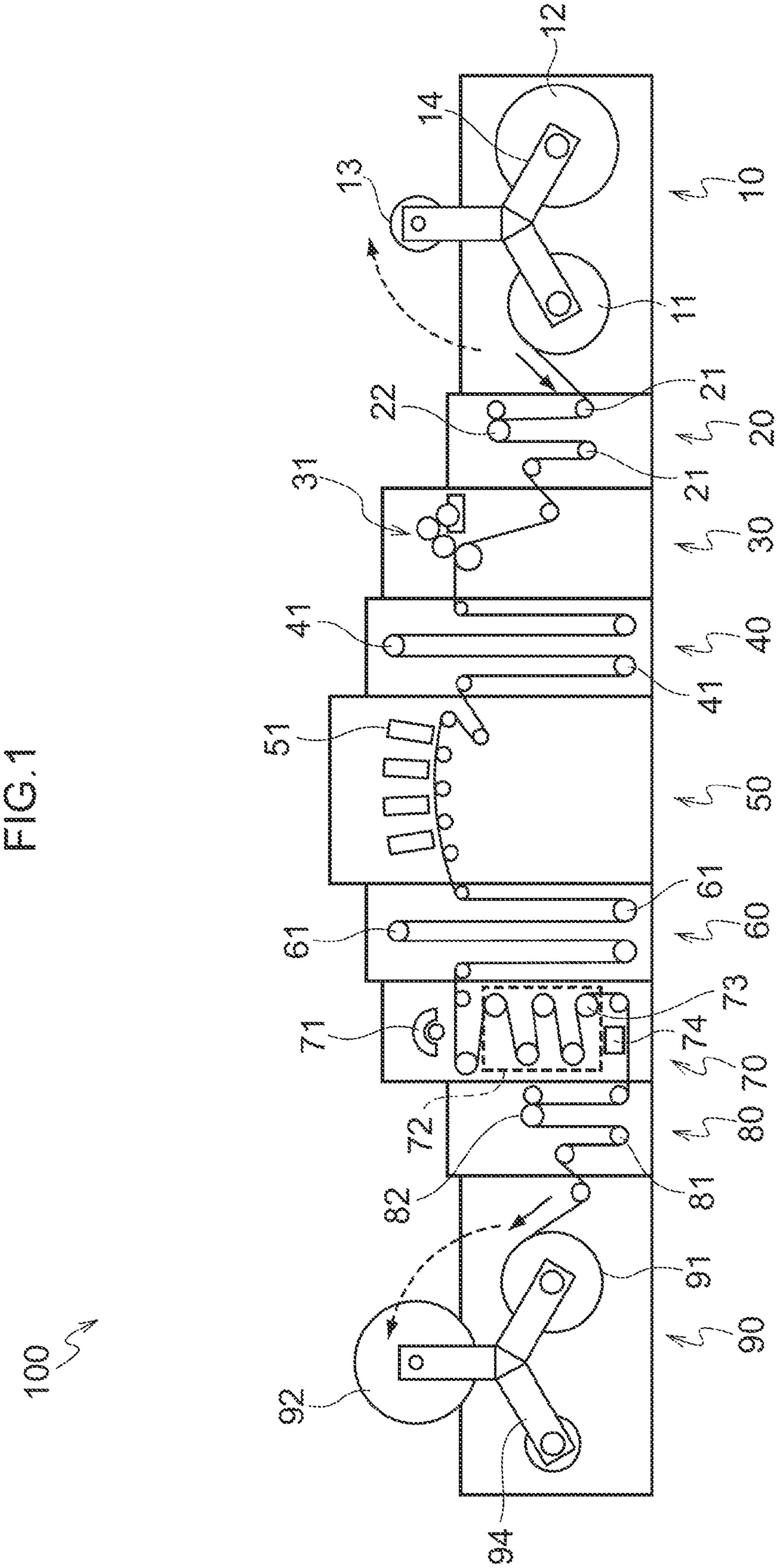
FIG. 1 is a conceptual diagram showing the main portions of an image recording apparatus pertaining to the exemplary embodiment of the present invention.

As shown in FIG. 1, in an image recording apparatus 100 pertaining to the present exemplary embodiment, a feed section 10 that feeds and conveys a web (continuous paper) P serving as a recording medium is disposed on an upstream side in a conveyance direction of the web P. On the conveyance direction downstream side of this feed section 10, an infeed section 20, a process liquid applying section 30, a first drying section 40, an image forming section 50, a second drying section 60, a fixing and reading section 70, an outfeed section 80, and a collecting section 90 are sequentially disposed along the conveyance direction of the web P. The infeed section 20 pulls out the web P from the feed section 10 and temporarily stores the web P. The process liquid applying section 30 applies a process liquid to a recording surface of the web P. The first drying section 40 dries the web P. The image forming section 50 forms an image on the recording surface of the web P. The second drying section 60 dries the image and fixes it to the web P. The fixing and reading section 70 fixes the image and reads it with a scanner or the like. The outfeed section 80 temporarily stores the web P. The collecting section 90 collects the web P to which the image has been fixed. An unillustrated controller that controls the actions of each section is also disposed, and the controller all-inclusively controls the actions of the entire apparatus.

Further, although there are no particular restrictions on the recording medium that is used as the web P, general printing paper whose main constituent is cellulose—such as so-called wood-free paper, coated paper, and art paper—and which is used in general offset printing and so forth can be used. As described later, the recording medium is not limited to roll paper and may also be sheets (cut paper).

With general printing paper whose main constituent is cellulose, in image recording resulting from general inkjet methods using water-based ink, ink absorption and drying are comparatively slow, color material migration easily occurs after ejection, and image quality easily drops, but according to the inkjet recording of the present invention, the recording of a high-quality image in which color material migration is suppressed and which has excellent color density and color hue is possible. Each of the processing sections will be described below.

<Feed Section>

As shown in FIG. 1, the feed section 10 is equipped with a reel stand 14 onto which a feed roll 12 (feed reel) is loaded. When a feed roll 11 in use in the middle of a printing operation is near its end, the feed section 10 prepares the new feed roll 12, connects the roll paper on the old feed roll 11 and the roll paper on the new feed roll 12 to each other, and feeds the web P (band-like paper) continuously so that there is no break in the continuous process.

In FIG. 1, the feed roll 11 is a feed roll that is in use, the feed roll 12 is a feed roll that has been prepared to be used next, and a feed roll 13 is a feed roll that has been used up and whose web P has finished being consumed. As for the method of replacing the old feed roll with the new feed roll, an arm of the reel stand 14 is rotated clockwise in the drawing and brought closer to the traveling line of the web P. The circumferential speed of the feed roll 12 is synchronized with the traveling speed of the web P, an unillustrated paper splicing device is actuated to press a gluing part of the leading end of the feed roll 12 against the web P and splice the two together, and the feed roll 11 that is currently in use and the web P are cut apart by a cutter of the paper splicing device. Therefore, the feed roll 11 becomes the feed roll 13 that has been used up.

<Infeed Section>

As shown in FIG. 1, in the infeed section 20, there is disposed an infeed roller pair 21 that pulls out the web P from the feed section 10. The rotational speed of the infeed roller pair 21 can be freely set. A dancer roller 22 that is swung and held up and down in the drawing by an unillustrated actuator and performs adjustment of the tension in the web P is disposed in order to temporarily store an adjustment margin of the web P needed for time to splice the web P as described above and changing the conveyance speed of the web P.

That is, the infeed section 20 has a role as a paper accumulating section that temporarily stores the web P stretched across the infeed roller pair 21 and the dancer roller 22 when the infeed roller pair 21 and the dancer roller 22 are a maximum distance apart from each other. While the web P is temporarily not fed from the feed section 10, such as during the time when the web P is being spliced, the infeed section 20 decreases the distance between the infeed roller pair 21 and the dancer roller 22 and conveys the web P to the process liquid applying section 30 on the conveyance direction downstream side.

<Process Liquid Applying Section>

As shown in FIG. 1, in the process liquid applying section 30, there is placed an applying roller unit 31 that applies to the recording surface (the surface on which an image is recorded, the top side in the drawings) of the web P a process liquid that causes a flocculation reaction with the ink that is ejected in the later-described image forming section 50. The process liquid that is applied here includes a flocculant that causes the components in the ink composition to aggregate.

By applying this process liquid, the ink and the process liquid cause a flocculation reaction at the recording surface of the web P after image recording, problems and image failure such as bleeding, landing interference (unity), and color mixing after ink landing do not occur, and the formation of a high-quality image becomes possible.

The flocculant that is used may be a compound that can change the pH of the ink composition, or may be a multivalent metal salt, or may be a polyallylamine. Preferred examples of compounds that can lower the pH include highly water-soluble acidic substances (phosphoric acid, oxalic acid, malonic acid, citric acid, or derivatives of these compounds, or salts of these compounds, etc.). One type of acidic substance may be used alone, or two or more types of acidic substances may be combined. This raises cohesion and immobilizes the whole ink. It is preferred that the pH (25° C.) of the ink composition be equal to or greater than 8.0 and that the pH (25° C.) of the process liquid be in the range of 0.5 to 4. This makes it possible to improve image density and resolution, and to speed up inkjet recording.

Further, other additives (publicly known additives such as an anti-drying agent (=a wetting agent), an anti-fading agent, an emulsion stabilizer, a permeation enhancer, a UV absorber, a preservative, an antifungal agent, a pH modifier, a surface tension modifier, a defoamer, a viscosity modifier, a dispersant, a dispersion stabilizer, a corrosion inhibitor, a chelating agent, etc.) can also be included in the process liquid.

<First Drying Section>

As shown in FIG. 1, in the first drying section 40, dancer rollers 41 that are swung and held in the vertical direction in the drawing by an unillustrated actuator and perform adjustment of the tension in the web P are disposed in order to temporarily store the web P needed for time to splice the web P as described above and changing the conveyance speed of the web P. The ink drying section 40 is given a configuration where it blows a heated air flow onto the web P from an unillustrated fan heater to thereby heat and dry the web P that is stretched across these dancer rollers 41.

At this time, the air volume and the air temperature of the heated air flow in the first drying section 40 may also be weakened (lowered) at the times of acceleration and deceleration as described later. This is to prevent overdrying because the amount of time required for the web P to pass through the first drying section 40 becomes longer at the times of acceleration and deceleration than at the time when the web P is conveyed at its ordinary speed (at the time of recording).

<Image Forming Section>

As shown in FIG. 1, in the image forming section 50, one or plural recording heads 51 are disposed in positions opposing the recording surface of the web P.

In the example shown in FIG. 1, four recording heads 51 jet ink droplets of the colors of C, M, Y, and K onto the recording surface of the web P to form an image thereon. The conveyance path of the web P is given a convex shape in which the recording surface side bulges, and tension is applied to the web P, whereby flapping of the web P is suppressed and a clearance between each of the recording heads 51 and the recording surface is ensured.

The ink jetted from the recording heads 51 is a water-based ultraviolet-curable ink, for example, and includes a pigment, polymer particles, and a water-soluble polymerizable compound that is polymerized by an active energy ray. A water-based ultraviolet-curable ink is curable as a result of ultraviolet light being applied thereto and forms on the recording surface an image that has excellent ability to withstand scratches and whose film strength is high.

For the pigment, for example, a water-dispersible pigment in which at least part of the surface thereof is coated with a polymeric dispersant is used. It is preferred that the acid value of the polymeric dispersant be in the range of 25 to 100 KOH mg/g. Therefore, the stability of self-dispersion becomes good and cohesion when the process liquid makes contact becomes good. Further, for the polymer particles, self-dispersing polymer particles whose acid value is 20 to 50 KOH mg/g are preferably used. Therefore, the ink can be made into one in which the stability of self-dispersion is good and cohesion when the process liquid makes contact is good.

As the polymerizable compound, a nonionic or cationic polymerizable compound is preferred in terms of not impeding the reaction between the flocculant and the pigment and polymer particles, and a polymerizable compound whose solubility with respect to water is equal to or greater than 10% by mass (or equal to greater than 15% by mass) is preferred.

At least one of the ink composition and the process liquid may further include an initiator that initiates the polymerization of the polymerizable compound by the active energy ray. For the initiator, a compound that can initiate the polymerization reaction by the active energy ray can be appropriately selected and included; for example, an initiator (e.g., a photopolymerization initiator) that generates an active species (radical, acid, base, etc.) by radiation, light, or an electron beam can be used.

Further, the ink includes water at 50 to 70% by mass, and other water-soluble organic solvents and publicly known additives—such as an anti-drying agent (a wetting agent), an anti-fading agent, an emulsion stabilizer, a permeation enhancer, a UV absorber, a preservative, an antifungal agent, a pH modifier, a surface tension modifier, a defoamer, a viscosity modifier, a dispersant, a dispersion stabilizer, a corrosion inhibitor, a chelating agent, etc.—may also be added.

<Second Drying Section>

As shown in FIG. 1, the second drying section 60 basically has the same configuration as that of the first drying section 40. In the second drying section 60, dancer rollers 61 that are swung and held in the vertical direction in the drawing by an unillustrated actuator and perform adjustment of the tension in the web P are disposed in order to temporarily store the web P needed for time to splice the web P as described above and changing the conveyance speed of the web P. The ink drying section 60 is given a configuration where it blows a heated air flow onto the web P from an unillustrated fan heater to thereby heat and dry the web P that is stretched across these dancer rollers 61.

At this time, like in the first drying section 40, the air volume and the air temperature of the heated air flow in the second drying section 60 may also be weakened (lowered) at the times of acceleration and deceleration. This is to prevent overdrying because the amount of time required for the web P to pass through the second drying section 60 becomes longer at the times of acceleration and deceleration than at the time when the web P is conveyed at its ordinary speed (at the time of recording).

<Fixing and Reading Section>

As shown in FIG. 1, in the fixing and reading section 70, there is disposed an ultraviolet emitting light source 71. The ultraviolet emitting light source 71 applies ultraviolet light to the recording surface of the web P after image recording to thereby solidify the aggregate of the process liquid and the ink. After this, a cooling device 72 disposed on the conveyance direction downstream side cools the web P to an appropriate temperature and fixes the image to the web P.

The cooling device 72 is equipped with plural cooling rollers 73. As the web P is conveyed between the plural cooling rollers 73, the web P loses its conductive heat and is cooled because of contact with the cooling rollers 73.

After the image on the recording surface has been fixed, a scanner 74 reads the image on the recording surface to detect jetting defects, landing position deviations, density deviations, and so forth resulting from problems in the recording heads 51 when the image was formed on the recording surface in the image forming section 50 and feeds back information to an unillustrated controller for correction and adjustment.

<Outfeed Section>

As shown in FIG. 1, in the outfeed section 80, there is disposed an outfeed roller pair 81 that pulls out the web P from the fixing and reading section 70. The rotational speed of the outfeed roller pair 81 can be freely set. A dancer roller 82 that is swung and held up and down in the drawing by an unillustrated actuator and performs adjustment of the tension in the web P is disposed in order to temporarily store an adjustment margin of the web P needed for time to splice the web P as described above and changing the conveyance speed of the web P.

That is, the outfeed section 80 has a role as a paper accumulating section that temporarily stores the web P stretched across the outfeed roller pair 81 and the dancer roller 82 when the outfeed roller pair 81 and the dancer roller 82 are a maximum distance apart from each other. While the web P is temporarily not fed from the upstream side, such as during the time when the web P is being spliced, the outfeed section 80 decreases the distance between the outfeed roller pair 81 and the dancer roller 82 and conveys the web P to the collecting section 90 on the conveyance direction downstream side.

<Collecting Section>

As shown in FIG. 1, in the collecting section 90, there is disposed a reel stand 94 to which plural winding cores 91 are attached. At the time of collection of the web P, an arm of the reel stand 94 is rotated to bring a winding core 91 closer to the conveyance path of the web P, an unillustrated core joining device presses the web P against an adhering part of that winding core 91 to join the web P to that adhering part, and thereafter a cutter of the core joining device cuts apart a roll 92 and the web P. Therefore, the web P that has been conveyed thereto is sequentially taken up and collected on the winding core 91. Alternatively, the collecting section 90 may also be given a configuration where a folder is disposed instead of the winding cores 91 so that the web P is folded and collected rather than being collected in a roll form.

<Test Pattern Formation>

A test pattern that is recorded at the time of deceleration of the web P in the image recording apparatus 100 pertaining to the present invention will be described below.

In the present invention, the image recording apparatus 100 prints a predetermined test pattern on the web P at the time of deceleration (and at the time of acceleration as needed) of the web P, uses the data of the test pattern at the time of deceleration to decide whether or not maintenance is needed and to select the content of maintenance, and uses the data of the test pattern at the time of acceleration to correct the data of the current printing.

Figure 2:
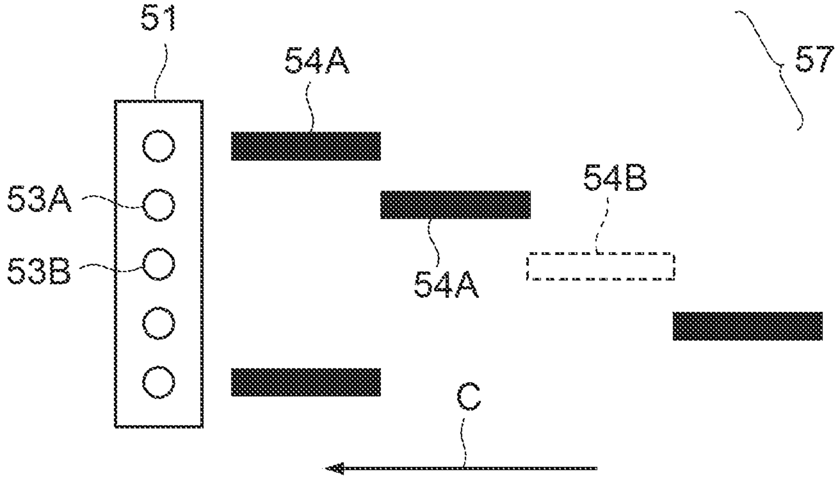
FIG. 2 is a diagram showing an example of a misfiring nozzle detection pattern of a recording head pertaining to the exemplary embodiment of the present invention.

Examples of types of test patterns used in the present invention include a test pattern 57, which is a nozzle check pattern in which lines 54 like in FIG. 2 (or dots 55 like in FIG. 3) are drawn from nozzles 53 of each of the recording heads 51 to acquire data of jetting defects (misfiring, direction deviation) of the nozzles 53.

For example, when the lines 54 have been test-outputted from the nozzles 53 onto the web P conveyed in the direction of arrow C like in FIG. 2, patterns such as lines 54A is obtained from nozzles 53A from which the ink is being jetted properly, but a pattern is not obtained from a nozzle 53B in which there is a jetting defect, so this area becomes blank such as a line 54B.

Figure 3:
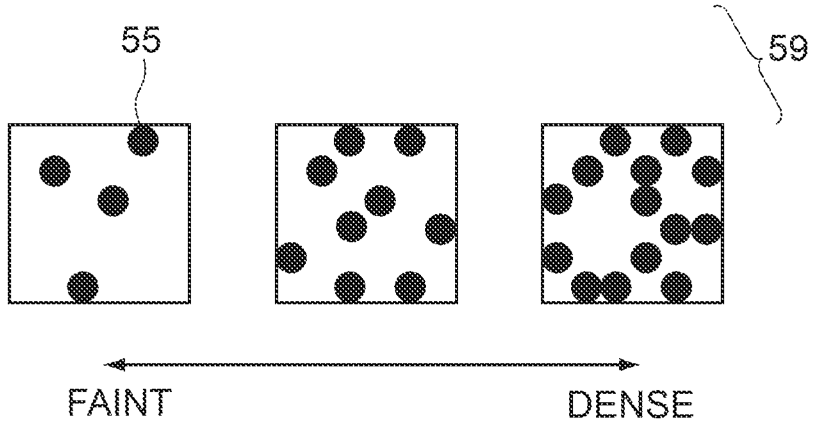
FIG. 3 is a diagram showing an example of dot arrangement patterns by density pertaining to the exemplary embodiment of the present invention.

Moreover, as shown in FIG. 3, a test pattern 59, which is a density check pattern in which patches are simultaneously outputted from the plural nozzles 53 to acquire density data of a predetermined region (e.g., 20 mm in a nozzle row direction), is conceivable.

Next, methods of deciding the printing order of the test pattern of the present invention include a method of dividing by density data of an input image at the time of the subsequent printing and a method of dividing by reading levels (S/N ratios at the time of reading) by color.

First, in relation to the method of dividing by the density data of an input image, usually in the case of inkjet printing, unevenness tends to be most easily noticeable in intermediate density portions. This is because, as shown in FIG. 3, in a low density region, the dots 55 do not overlap in the first place, and even if the landing positions (formation positions) of the dots 55 and the diameters of the dots 55 deviate somewhat from their normal positions and assumed sizes, the effect that error in positional precision and dot diameter has on visibility is small.

Further, similarly, as shown in FIG. 3, in a high density region, the dots 55 densely overlap, so in this case also, even if the landing positions of the dots 55 and the dot diameters deviate somewhat from their normal positions and assumed sizes, the effect that those have on visibility is small.

In contrast, in an intermediate density region, the difference between a given dot 55 that overlaps another dot 55 and a given dot 55 that does not overlap another dot 55 is smaller than in the low-density region and the high-density region, so if the landing positions of the dots 55 and the dot diameters deviate, the difference ends up becoming more easily noticeable compared to the dots 55 in the high density region and the low density region. Consequently, it is necessary to perform maintenance before printing in order to reduce as much as possible unevenness in the pattern of the intermediate density region. That is, at the time of deceleration, it is preferable to print a test pattern in a color order in which there is a little data of the intermediate density region of the input image of the subsequent printing, and conversely, at the time of acceleration, it is preferable to print a test pattern in a color order in which there is a lot of data of the intermediate density region of the input image of the subsequent printing (not an image to be printed after the acceleration but an image to be printed after the web P has decelerated after that and has then accelerated anew).

In relation to which density region is to taken as intermediate density, generally it is preferable to take it to be about 30 to 70% of the maximum density of each color, but it is not invariably necessary for it to be in this range and it may also be appropriately changed depending on the parameters of the recording heads 51, such as the density of the ink to be used, the resolution (inter-nozzle distance) of the recording head, and dot diameter.

In the present invention, the image recording apparatus 100 is given a configuration where it reads the test pattern with a reading section (the scanner 74) as described above. At the time of this reading, it is preferable to apply an RGB filter to the incident light or the reflected light in order to improve the read S/N ratio per ink color, but depending on the spectral characteristics (spectral absorption characteristics) of the filter and the spectral absorption characteristics of the color material of each color, there are colors whose read S/N ratio is large (whose measurement error is small) and colors whose read S/N ratio is small (whose measurement error is large). As a way of determining the S/N ratios, for example, the S/N ratios can be expressed such that S=the output value after the reading of the ink jetting portion and N=the output value after the reading of the paper portion.

At this time, during acceleration of the web P, the scanner 74 reads in order beginning with the color whose read S/N ratio is small, and during deceleration of the web P, the scanner 74 reads in order beginning with the color whose S/N ratio is large, whereby passage time (=reading time) can be gained in colors whose read S/N ratios are small, and as a result measurement precision can be improved.

<Effect: Deciding Whether or not Maintenance is Needed>

First data obtained by outputting the test patterns 57 and 59 during deceleration of the web P and reading the test patterns 57 and 59 with the scanner 74 can be used to determine various conditions at the time of maintenance of the recording heads 51 thereafter.

Maintenance conditions may be decided from only the first data formed during deceleration of the web P, but more preferably an aspect of determining the difference between second data obtained as a result of being outputted during acceleration (before the current printing) of the web P and the first data obtained as a result of being outputted during deceleration (after the current printing), deciding on the basis of this difference whether or not maintenance is needed, and changing the maintenance level in a case where it has been decided that maintenance is needed is preferable.

Therefore, for example, even in a jetting-defective nozzle 53 in the same way, a nozzle 53 that is constantly jetting-defective and a nozzle 53 that has become jetting-defective during the current printing can be separated. That is, if the data during acceleration (before jetting) are normal and there is a jetting defect in the data during deceleration (after jetting), it can be decided that the jetting defect has occurred in the current printing.

The image recording apparatus 100 may also be configured such it does not perform maintenance when the difference between the second data obtained during acceleration and the first data obtained during deceleration is equal to or less than a first threshold value, and such that it performs ordinary maintenance when the difference exceeds the first threshold value and is equal to or less than a second threshold value, and such that it performs forced maintenance when the difference exceeds the second threshold value.

Divisions are conceivable by which the ordinary maintenance mentioned here entails only wiping the nozzle 53 surface and the forced maintenance entails purging (forced jetting) from the nozzles 53 that are misfiring and then wiping the nozzle 53 surface. Therefore, it becomes possible to cut back on unneeded maintenance, and the amount of ink that becomes wasted at the time of maintenance and the amount of maintenance time can be reduced.

<Effect: Deciding Whether or Not Maintenance is Needed by Recording Head Position>

Each of the recording heads 51 disposed in the image forming section 50 of the image recording apparatus 100 pertaining to the present invention may be equipped with a moving mechanism exemplified below, whereby the recording head 51 is supported so as to be movable in a direction toward and away from the conveyance surface of the web P. Therefore, the recording head 51 is given a configuration in which its throw distance (TD) can be changed.

Figure 4:
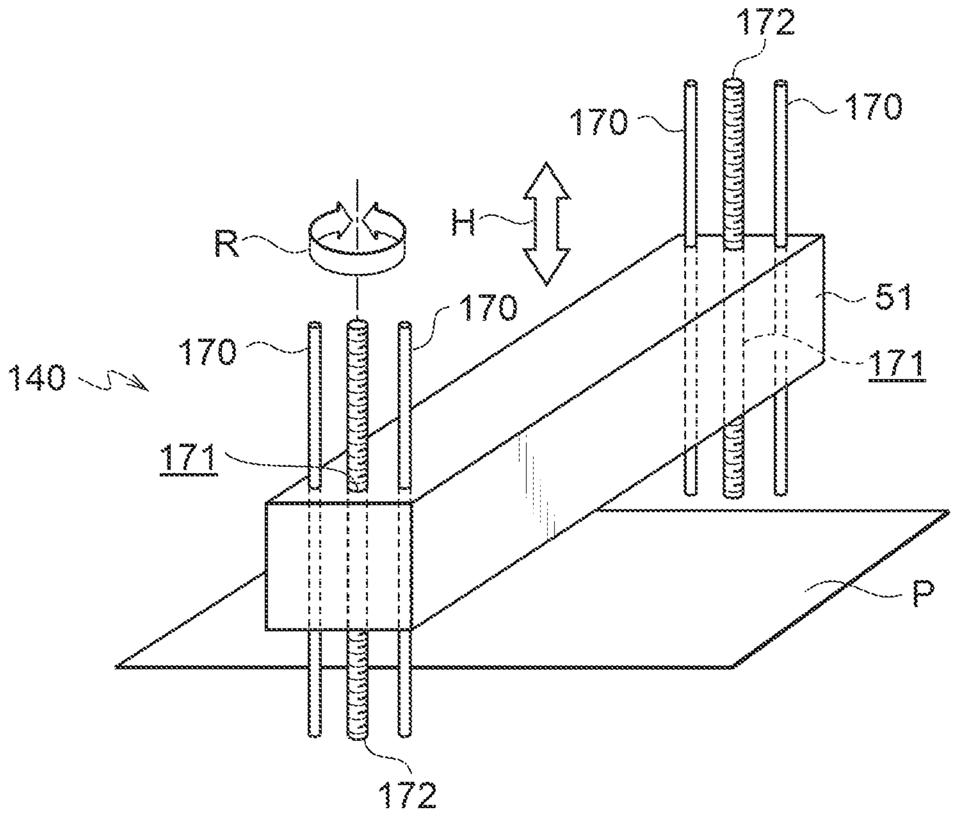
FIG. 4 is a perspective view showing a raising-and-lowering mechanism of the recording head pertaining to the exemplary embodiment of the present invention.

For example, the recording head 51 may be raised and lowered (moved toward and away from the recording surface of the web P) by a raising-and-lowering mechanism 140 such as shown in FIG. 4.

As shown in FIG. 4, on both lengthwise direction ends of the recording head 51, guide pins 170 that are disposed in the toward-and-away direction with respect to the web P penetrate the recording head 51, and the recording head 51 is made movable in the toward-and-away (up-and-down) direction along the guide pins 170.

Threaded holes 171 penetrate the recording head 51 in the toward-and-away direction, and shafts 172 that screw along the threaded holes 171 are disposed extending in the toward-and-away direction. The shafts 172 are driven to turn by an unillustrated stepping motor. Threads are cut into the outer peripheral surfaces of the shafts 172, and when the shafts 172 turn in the direction of arrow R in FIG. 4, the shafts 172 screw along the threaded holes 171 and enable the recording head 51 to be moved (raised and lowered) in the direction of arrow H (toward-and-away direction).

Using the recording head 51 with this configuration, data pertaining to the determination of whether or not maintenance is needed can be acquired by moving the recording head 51 up and down (in directions toward and away from the web P) during deceleration of the web P and recording a test pattern.

By raising the recording head 51 (the nozzles 53) during deceleration of the web P, recording a test pattern a plural number of times, and determining differences between the plural test patterns, causes of jetting direction defects in the nozzles 53 can be separated. That is, it becomes possible to classify the causes into two types of causes: deviations in the jetting direction and deviations in the positions of the nozzles 53 themselves (where the liquid droplets are jetted perpendicularly with respect to the web P but the positions of the nozzles 53 are shifted).

Figure 5:
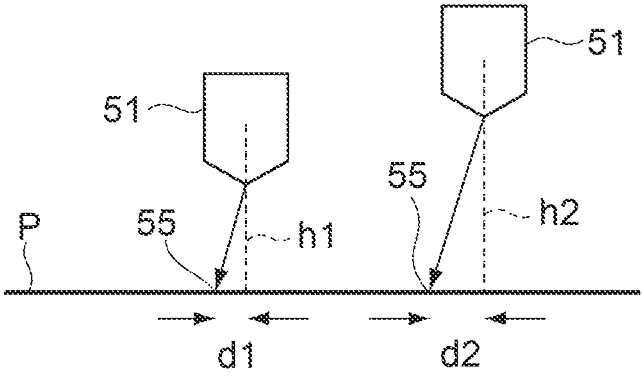
FIG. 5 is a side view showing landing position deviations resulting from the position of the recording head pertaining to the exemplary embodiment of the present invention.

As shown in FIG. 5, in a case where position deviation becomes large like from d1 to d2 when the TD is raised from h1 to h2, the cause of the jetting direction defect in the nozzles 53 can be considered a "deviation in the jetting direction". In this case, a case where the neighborhoods of the open portions of the nozzles 53 are soiled with residual ink or the like is conceivable, so the defect can be remedied by carefully performing maintenance thereafter with respect to the nozzles 53.

On the other hand, in a case where the position deviation d1 does not change (does not become larger) even when the TD is raised to h2, the positions of the nozzles 53 themselves shifting can be considered to be the cause of the jetting direction defect. Therefore, in this case the defect cannot be remedied even if maintenance is performed, so the image recording apparatus 100 determines to perform ordinary maintenance.

Therefore, jetting direction defects that can be remedied with maintenance can be remedied with forced maintenance including wiping the nozzle surface, for example, and with respect to jetting direction defects that cannot be remedied even if maintenance is performed, the wasting of ink and process time can be saved by performing only ordinary maintenance.

<Other>

An exemplary embodiment of the present invention has been described above, but the present invention is in no way limited to the above exemplary embodiment and, it goes without saying, can be implemented in various aspects in a scope not departing from the gist of the present invention.

For example, in the above exemplary embodiment, a configuration that conveys the web P that is long continuous paper was taken as an example, but the recording medium is not limited to this, and single sheets of a recording medium may also be used. That is, the image recording apparatus can be given a configuration where, when it conveys and records on single sheets of a recording medium one sheet at a time, it forms a test pattern at the time of deceleration of a test print and uses the test pattern to decide maintenance.

Moreover, the liquid that is jetted is not limited to ink for image recording, character printing, and so forth and may also be applied to substrate pattern formation at the time of etching, for example.

What is claimed is:

1. An image recording apparatus comprising:

a conveying section that accelerates a long-length recording medium from a stopped state to a predetermined speed, that conveys the long-length recording medium, and that decelerates the long-length recording medium to the stopped state;

a recording section that records an image on the recording medium during a current printing, and that forms a first test pattern on the recording medium after the image has been recorded during the current printing, at a time of deceleration of the recording medium;

a reading section that reads the image that the recording section has recorded and the first test pattern that the recording section has formed;

an image converting section that converts inputted image data into image data that the recording section outputs;

a maintenance section that performs maintenance of the recording section; and a controller that decides, on the basis of first data obtained by reading the first test pattern, whether or not the maintenance is needed and the content thereof, wherein the recording section is equipped with an inkjet recording head, and the first test pattern is a pattern for detecting jetting defects per nozzle of the inkjet recording head, and wherein the image recording apparatus does not perform the maintenance in a case in which a number of misfiring nozzles detected in the pattern for detecting jetting defects is equal to or less than a predetermined number.

2. The image recording apparatus according to claim 1, wherein the image recording apparatus forms a second test pattern on the recording medium at the time of acceleration of the recording medium, and decides, on the basis of the first data and second data obtained by reading the second test pattern, whether or not the maintenance is needed and the content thereof.

3. The image recording apparatus according to claim 2, wherein the image recording apparatus forms the second test pattern with a plurality of colors, and an output color order of the second test pattern is in descending order of proportions of intermediate densities of the image data.

4. The image recording apparatus according to claim 2, wherein the image recording apparatus forms the second test pattern with a plurality of colors, and an output color order of the second test pattern is in ascending order of S/N values of the image data read in the reading section, wherein, in S/N, S=an output value after reading an ink jetting portion of the image, and N=an output value after reading a paper portion of the image.

5. The image recording apparatus according to claim 2, wherein the second test pattern is also a pattern for detecting jetting defects per nozzle of the inkjet recording head.

6. The image recording apparatus according to claim 2, wherein one or both of the first test pattern and the second test pattern is a pattern for detecting average density of a predetermined region.

7. The image recording apparatus according to claim 1, wherein the image recording apparatus forms a first test pattern with a plurality of colors, and an output color order of the first test pattern is in descending order of S/N values of the image data read in the reading section, wherein, in S/N, S=an output value after reading an ink jetting portion of the image, and N=an output value after reading a paper portion of the image.

8. The image recording apparatus according to claim 1, further comprising a distance controlling section that controls a distance between the recording section and the recording medium, wherein the image recording apparatus forms the first test pattern a plural number of times while changing the distance during one deceleration, and decides, from a relationship between the distance and recording position deviation information extracted from plural sets of the first data read by the reading section, whether or not the maintenance is needed and the content thereof.

9. The image recording apparatus according to claim 1, wherein the recording section is equipped with an inkjet recording head, and the content of the maintenance includes wiping a nozzle surface of the inkjet recording head and forced jetting.

* * * * *